United States Patent Office 2,714,261
Patented Aug. 2, 1955

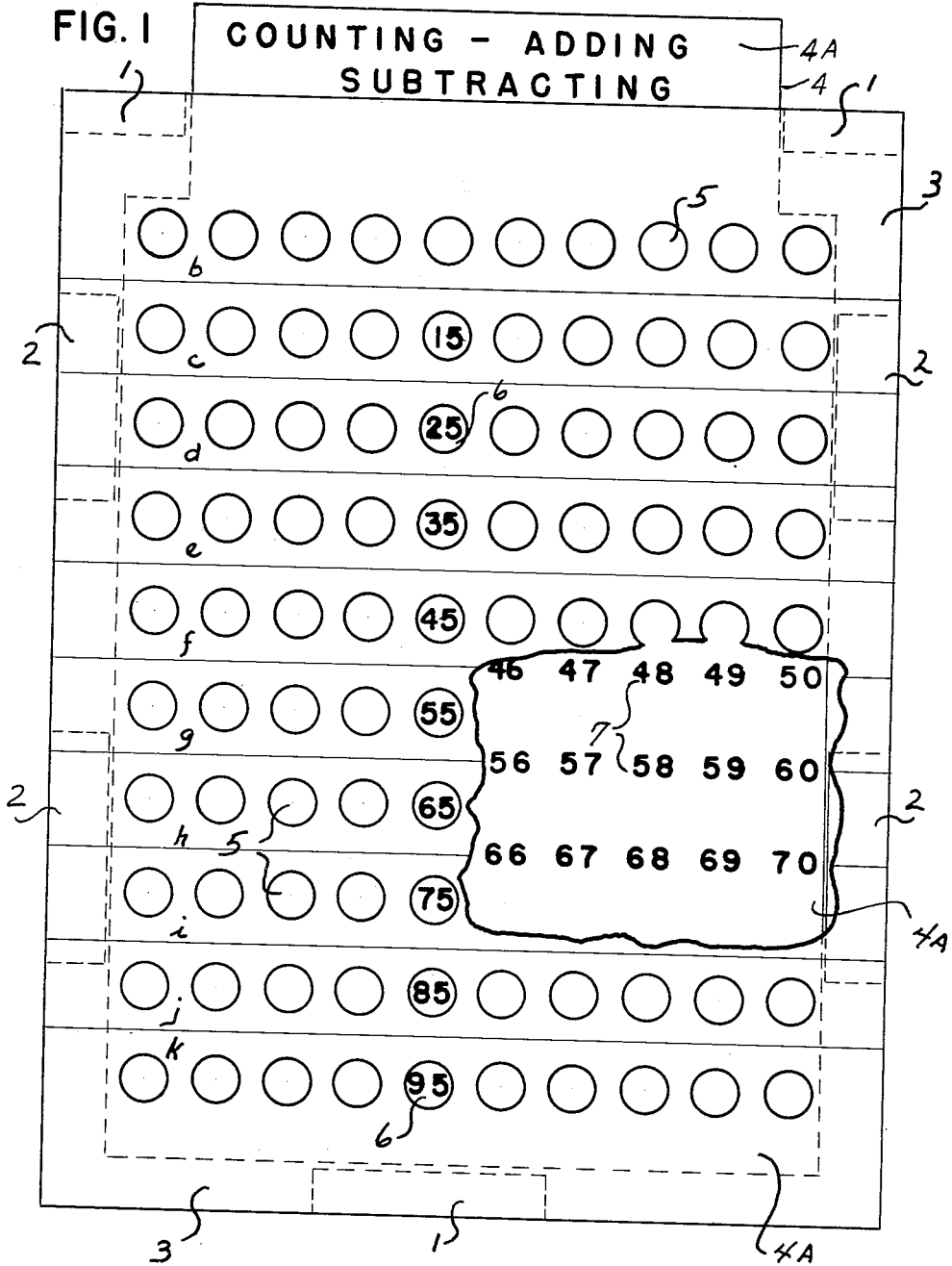

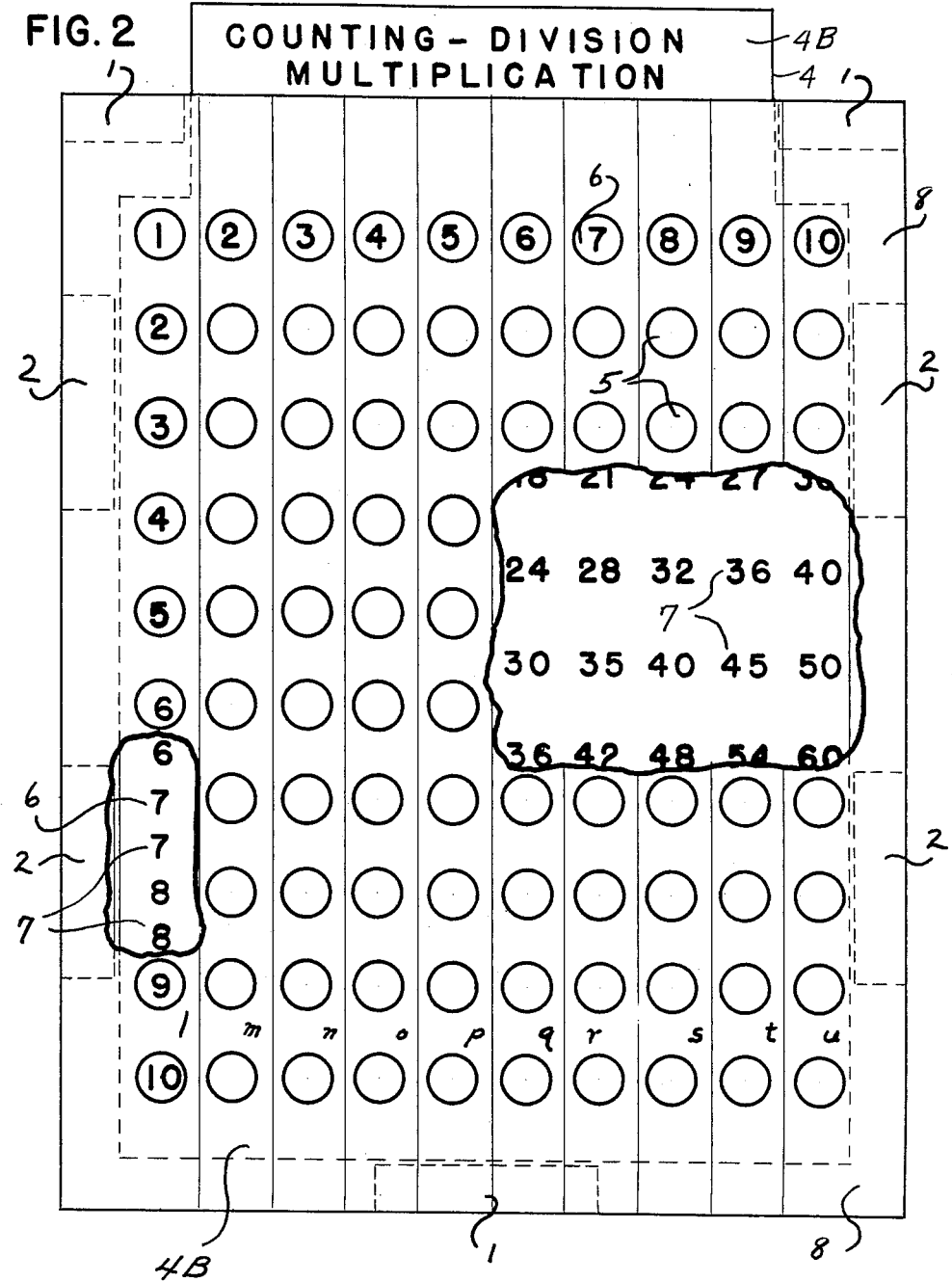

2,714,261

EDUCATIONAL DEVICES FOR TEACHING MATHEMATICS

James L. Hight, Dayton, Ohio

Application May 31, 1952, Serial No. 290,853

4 Claims. (Cl. 35—31)

The present invention relates to educational devices, and more particularly to a Hidden-Answer number card slide arranged to utilize colored areas for progressively teaching rudimentary mathematical principles from recognition of the Arabic numbers and their inter-relationship to the more advanced mathematical processes of addition, subtraction, multiplication, and division.

The general object of this invention is to provide a novel device of simple and economical construction for use in teaching the processes of mathematics through the power of visualization, object lessons, color association, and mechanical activity, instead of pure memorization.

A further object of the invention is to provide a device with which children may formulate their own problems, calculate the answers thereto, and by means of the Hidden-Answer feature, check the correctness of their thinking without the assistance from another person.

Another object of the invention is to provide an educational device which may be used in teaching a child to count systematically by units or by given multiples and for use in demonstrating the relationship of one number or group of numbers to another.

With these and other objects in view which will become apparent upon a perusal of the following description, the invention includes certain novel features of design and combinations of parts, a preferred form or embodiment of which is hereinafter described with reference to the drawings which accompany and form a part of this specification.

In the drawings:

Fig. 1 is a view of one side of the device used specifically for teaching a child the mathematical processes of unit counting, addition, and subtraction.

Fig. 2 is a view of the other side of the device used specifically for teaching a child the mathematical processes of mutiple counting, multiplication, and division.

Description

The form of the Hidden-Answer device illustrated in Figs. 1 and 2 consists of two outer cards or plates 3 and 8 made of any suitable material such as plastic or cardboard, attached near their perimeter by means of end spacers 1 and side spacers 2 which properly space said plates apart to provide clearance for receiving a sliding number card 4. Plate 3 is perforated by one hundred evenly spaced holes 5 which serve as view windows and are arranged ten holes to each of ten horizontal rows to provide the Hidden-Answer feature. Contrasting colors are used to delineate each of the ten horizontal rows or areas b–k, which bear a relationship to predetermined groups of the holes 5. The spacers 1 and 2 are inserted and secured between the plates 3 and 8 to hold said plates in proper fixed relationship to each other and to provide proper clearance so that the card 4 may slide freely up and down. End spacers 1 also serve to limit the vertical movement of number card 4, and side spacers 2 also serve to limit the lateral displacement of said card.

The side 4A of the sliding number card 4, illustrated in Fig. 1, has fundamental numbers 7 from 1 to 100 printed thereon in sequence from left to right in horizontal denominational rows of 10 arranged from top to bottom, plus additional reference numbers 6 in 15, 25, 35, 45, etc. relation successively, at intervals of ten in column or position five, to the last number of 95.

Plate 8 (Fig. 2) is perforated by one hundred holes 5 which serve as view-windows and are arranged to provide the Hidden-Answer feature. Contrasting colors are used to delineate vertical areas l–u of plate 8 which bear a relationship to predetermined groups of holes 5. The functions of spacers 1 and 2 are explained above. The side 4B of number card 4 (Fig. 2) has numbers printed thereon for use as multiplication products, that is, the rows of fundamental numbers 7 run parallel both vertically and horizontally in sequential order from 1 to 10 in multiples of 1, from 2 to 20 in multiples of 2, from 3 to 30 in multiples of 3, and so on successively to the last row of 10 to 100 in multiples of 10, plus additional horizontal and vertical rows of reference numbers (6) 1 to 10 positioned immediately above and to the left of the corresponding rows of numbers 7 to serve as multiplicands and multipliers for multiplication problems and to serve as minuends and subtrahends for subtraction problems when the Hidden-Number feature is used.

Operation

The process of teaching a child to count is, as is well known, a combination of repetition, memorization, and association. The child is first taught on side 4A of slide 4 with all the fundamental numbers 7 visible through the view-windows. The most successful method is to teach the numbers from 1 to 10, then from 10 to 20, and lastly from 10 to 100. After these three simple steps have been mastered, the child will very quickly learn to count to 100. After the child has mastered the process of counting with the fundamental number 7 exposed, he can then be taught how to count with the reference numbers 6 exposed and the fundamental numbers 7 hidden.

If a child is asked to add 3 and 4, he will usually count one, two, three, and then one, two, three, four, instead of one, two, three, . . ., four, five, six, seven. The Hidden-Answer feature provides a means of illustrating to the child the correct method for addition. Since the rows of fundamental numbers 7 are arranged in groups of tens, it is very simple to teach the child to add and subtract by groups instead of by individual numbers. For example: if 26 is to be added to 33, one takes the number 33, moves down two holes in same vertical row to 53. This adds 20 onto the original number, then count six numbers to the right and the answer, 59, is obtained. Subtraction problems are solved in the same manner except that one counts from right to left and from top to bottom. Any problem whose sum is 100 or less, or whose subtrahend is 100 or less, can be quickly calculated with the Hidden-Answer feature.

The process of teaching a child to count by multiples is likewise a combination of memorization, repetition, and association. Fig. 2 illustrates the side of the device designed for this purpose. This side is also the basis for the multiplication tables. It provides a means of illustrating that multiplication and division are not new and difficult processes, but are simply their old friends addition and subtraction. As soon as a child realizes that four times six means six added four times, the process of multiplication is no longer a mystery. By the same token, when the child realizes that 24 divided by 6 means how many times can 6 be subtracted from 24, division is simplified. If a child is taught the method of using the reference numbers 6 in the top row to formulate problems whose answer can be checked by pulling out the Hidden-Answer slide, multiplication becomes fun instead of a wearisome task. In teaching the multiplication table, an instructor should start with two times two and gradually work up to two times ten. During this process, if the child realizes that he is merely adding two to the previous answer he will soon be able to understand the basic principles of multiplication.

Division is taught in the same manner except that reverse relations and positions are maintained. The instructor can formulate any type problem he wishes by asking the child how many times does the number at the top or left hand end of a given row go into a given number within that row.

For example: Take the number 63 in the seventh horizontal row, and ask the child how many sevens in 63, or 63 divided by seven is what? The correct answer will be the number at the top of the vertical row where 63 is found.

While the form of device herein disclosed is admirably adapted to fulfill the objects primarily stated, it is not intended to limit the invention to this particular embodiment, as it is susceptible of embodiment in various other forms without departing from the principles taught herein.

What is claimed is:

1. A device of the class described, comprising in combination a central positionable slide having printed on one face thereof a vertical row of multipliers, a horizontal row of multiplicands, and ten horizontal rows of one hundred products corresponding to the multipliers and multiplicands, said horizontal rows of products being offset vertically in relation to the vertical row of multipliers, said products being arranged progressively in multiplies of one to ten, and a frame for the slide including front and back plates and spacers to secure said front and back plates in proper spaced-apart relationship to each other to receive said slide therebetween for limited vertical shifting movement between two positions, said front plate having therein one hundred openings arranged in horizontal rows of ten with the rows spaced apart in correspondence with the rows of products so that shifting the slide to one position reveals the multipliers and the multiplicands and conceals the products, and shifting said slide to the other position reveals the products and conceals the multipliers and multiplicands.

2. A device of the class described, comprising in combination a central positionable slide having printed on one face thereof one hundred product digits arranged in horizontal rows of ten digits each, a horizontal row of ten multiplicand digits located immediately above and in vertical alignment with the digits in the horizontal rows of products, and a vertical row of ten multiplier digits located with its units digit in horizontal alignment with the row of multiplicand digits and in vertical alignment with the left-hand digits in each horizontal row of products, and a frame for the slide comprising front and back plates and spacers to secure said plates in proper spaced-apart relationship to each other to receive said slide therebetween for shifting movement between two positions, said front plate having therein one hundred openings arranged in horizontal rows of ten openings each spaced apart to correspond to the one hundred products, so that shifting said slide to one position reveals all the product digits through the openings and simultaneously conceals the multiplicand and multiplier digits, and shifting said slide to the other position reveals the multiplicand digits through the upper horizontal row of openings and reveals the multiplier digits through the left-hand openings in each horizontal row of openings and simultaneously conceals all of the product digits.

3. A device of the class described, comprising in combination a cover plate having a series of circular holes therein arranged in ten rows of ten holes each, and a positionable slide mounted in back of the cover plate for vertical shifting movement between two positions, said slide bearing a vertical and a horizontal row of numbers one to ten representing multipliers and multiplicands, respectively, with the digit one of the multiplier row aligned with the row of multiplicands, and ten horizontal rows of ten numbers each representing products corresponding to the multipliers and multiplicands, said horizontal rows of products being offset vertically in relation to the row of multipliers, said products and the circular holes being equally spaced with respect to each other so that shifting the slide to one position reveals the products through said circular holes and simultaneously conceals the multipliers and multiplicands, and shifting said slide to the other position reveals the multipliers and multiplicands through certain ones on said circular holes and simultaneously conceals all the products.

4. A hidden answer device for teaching mathematics, comprising in combination spaced-apart front and back plates, said front plate having one hundred circular openings therein arranged in ten rows of ten openings each, and a central plate slidably supported between the front and back plates so as to be shiftable from one position to another, said central plate having printed thereon ten horizontal rows of ten numbers each representing products, said numbers arranged progressively in multiples one to ten and visible through the circular openings when the central plate is in said one position, said central plate also having printed thereon a horizontal row of numbers representing multiplicands located above and in alignment with the upper row of products, and a vertical row of numbers representing multipliers located with its units number aligned with the row of multiplicands and in vertical alignment with the first product in each horizontal row of products, said products and the circular openings being equally spaced with respect to each other so that moving said central plate to said one position hides the multiplicands and multipliers and reveals the products through the circular openings, and moving said central plate to said another position reveals the multiplicands and multipliers through certain ones of said circular openings and hides the products.

References Cited in the file of this patent

UNITED STATES PATENTS

| 649,054 | Holibaugh | May 8, 1900 |
| 1,732,983 | Orchard | Oct. 22, 1929 |
| 1,867,888 | Obidine | July 19, 1932 |
| 2,625,750 | Merrill | Jan. 20, 1953 |

FOREIGN PATENTS

| 58,541 | Germany | Mar. 8, 1891 |
| 451,619 | Germany | Nov. 1, 1927 |